United States Patent [19]

Smith et al.

[11] Patent Number: 5,129,765
[45] Date of Patent: Jul. 14, 1992

[54] AIR CONVEYOR DECK HAVING PROTUBERANCES

[75] Inventors: Paul W. Smith, Forest; Brian K. Hilbish, Beford, both of Va.

[73] Assignee: Simplimatic Engineering Company, Lynchburg, Va.

[21] Appl. No.: 756,811

[22] Filed: Sep. 9, 1991

[51] Int. Cl.$^5$ .............................................. B65G 51/03
[52] U.S. Cl. ...................................... 406/86; 406/88
[58] Field of Search .................... 406/86, 88; 198/721; 414/676

[56] References Cited

U.S. PATENT DOCUMENTS

| | | |
|---|---|---|
| 690,675 | 1/1902 | Taisey . |
| 3,257,964 | 6/1966 | Connors . |
| 3,273,727 | 9/1966 | Rogers et al. . |
| 3,413,041 | 11/1968 | Moorman . |
| 3,473,483 | 10/1969 | York . |
| 3,513,934 | 5/1970 | Crowley . |
| 3,545,813 | 12/1970 | Matsumoto . |
| 3,692,192 | 9/1972 | Baldur . |
| 3,808,977 | 5/1974 | Smoot et al. . |
| 4,030,755 | 6/1977 | Heimke . |
| 4,355,940 | 10/1982 | Drickson . |
| 4,392,760 | 7/1983 | Futer . |
| 4,621,953 | 11/1986 | McGuth . |
| 4,805,626 | 2/1989 | DiMassimo et al. . |
| 4,822,214 | 4/1989 | Aidlin et al. . |
| 4,896,610 | 1/1990 | Denne . |

Primary Examiner—Margaret A. Focarino
Assistant Examiner—James M. Kannofsky
Attorney, Agent, or Firm—St. Onge, Steward, Johnston & Reens

[57] ABSTRACT

An air conveyor is provided comprising a plenum chamber including a deck plate, a plurality of first apertures in the deck plate for directing air from the plenum chamber to convey articles, and a plurality of protuberances extending from the deck plate for receiving bottoms of the articles. The protuberances preferably protrude from the deck plate far enough to support the articles above accumulated slide resistance increasing material. The air conveyor deck plate preferably also includes a plurality of second apertures for directing air from the plenum chamber to aid in lifting the articles.

23 Claims, 2 Drawing Sheets

AIR CONVEYOR DECK HAVING PROTUBERANCES

FIELD OF THE INVENTION

This invention relates to air conveyors for conveying relatively heavy articles or for conveying articles in environments where the air conveyor may accumulate material forming a residue which increases sliding resistance between the air conveyor and the articles. More specifically, the invention relates to air conveyors including decks having a plurality of protuberances.

BACKGROUND ART

Air conveyors such as that disclosed in U.S. Pat. No. 4,392,760 are well known and widely used in the art. Modifications and variations have been made to these prior art air conveyors in an effort to solve problems associated with conveying particular types of articles. For example, U.S. Pat. No. 4,822,214 discloses an air conveyor designed for conveying both PET container bodies and flat-bottomed base cups.

Prior art air conveyors, however, are not particularly well adapted either to convey relatively heavy articles, or to convey articles in environments where the conveyor may accumulate material forming a residue which increases sliding resistance between the conveyor and the articles. In order to convey relatively heavy articles, prior art air conveyors generally utilize relatively high air pressures which disadvantageously may transport articles at excessive speeds. Upon accumulation, articles transported at such excessive speeds may be damaged. Similarly, in order to convey articles which tend to stick to or otherwise generate relatively high sliding resistance with the transport surface, prior art air conveyors again generally utilize disadvantageously high air pressure. With heavy enough articles or large enough sliding resistances, prior art air conveyors are generally inefficient and eventually become inoperable.

It is known to provide curved transport surfaces with anti-friction ribs in dispatch tubes and protruding supporting elements in ski mats. U.S. Pat. No. 690,675 discloses a dispatch tube 1,2 having anti-friction ribs 6,7 therewithin. U.S. Pat. No. 3,473,483 discloses a preferably concave ski mat or track 10 including universal supporting elements 22 comprising spherical balls and means for rotatably mounting the balls.

Air cushion or flotation devices having various features for aiding to lift articles are also known and widely used. U.S. Pat. No. 4,805,626 discloses an air flotation patient bed including spheres 19 which prevent escape of air in chamber 25 unless bed 12 depresses spheres 19 within openings 21.

U.S. Pat. No. 3,692,192 discloses an air cushion lift pad comprising a flat base, a flat flexible diaphragm sheet and a flat cover plate provided with openings. The diaphragm portions exposed openings include perforations.

U.S. Pat. No. 4,355,940 discloses a platform 10 including a plurality of drive rollers 13 to transport loads. A plurality of air exit ports 14 are used to provide an air bearing surface for the loads.

U.S. Pat. No. 3,545,813 discloses an air-film conveying apparatus comprising a platform plate having holes 2 for passing compressed air from chamber 3. A protecting member 4 made of pile fabric is disposed on plate 1 to protect the flat bottom surface of transported articles.

SUMMARY OF THE INVENTION

Accordingly, it is an object of this invention to provide an air conveyor which is relatively efficient and dependable in use.

Another object of the invention is an air conveyor of the above character which is used for conveying relatively heavy or either articles tending to stick to the conveyor.

A further object of the invention is an air conveyor of the above character which conveys articles at a controlled speed.

Yet another object of the invention is to provide an air conveyor which reduces sliding resistance between the conveyor and the articles.

A still further object of the invention is an air conveyor which has a deck plate including a plurality of protuberances.

These and other objects are achieved by provision of an air conveyor comprising a plenum chamber including a deck plate, a plurality of first apertures in the deck plate for directing air from the plenum chamber to convey articles, and a plurality of protuberances extending from the deck plate for receiving bottoms of the articles in at least three substantially point contacts. The air conveyor deck plate preferably also includes a plurality of second apertures for directing air from the plenum chamber to aid in lifting the articles.

The protuberances preferably protrude from the deck plate far enough to support the articles above accumulated material. Preferably, the protuberances, first apertures and second apertures are arranged in a plurality of respective rows aligned substantially parallel with a transport path. Most preferably the rows are arranged according to a particular pattern.

The invention and its particular features will become more apparent from the following detailed description considered with reference to the accompanying drawings.

DETAILED DESCRIPTION OF THE INVENTION

Figure 1:
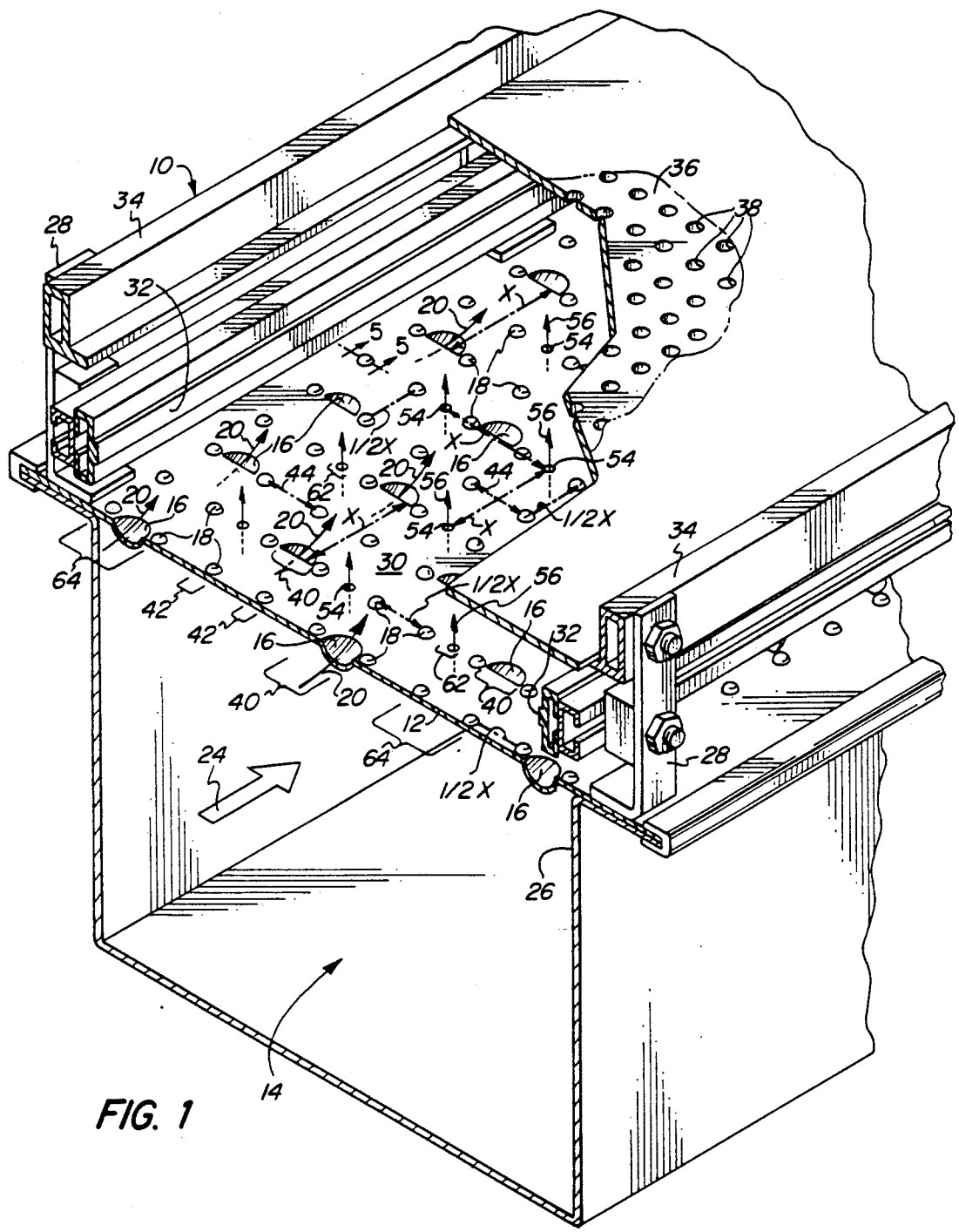
FIG. 1 is a cross-sectional isometric front view of an air conveyor in accordance with this invention.
Figure 2:
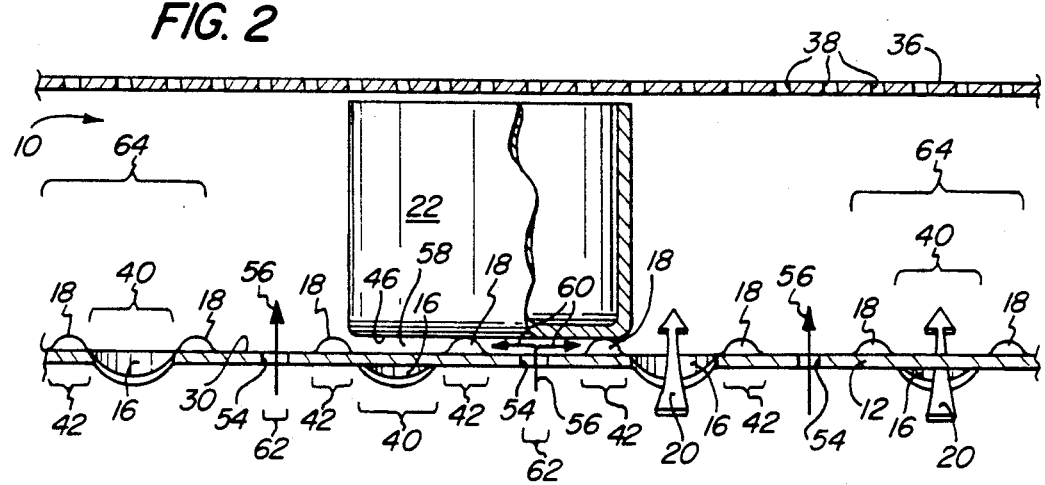
FIG. 2 is a partial cross-sectional end elevation view of the air conveyor of FIG. 1 including an article for transport thereby.
Figure 3:
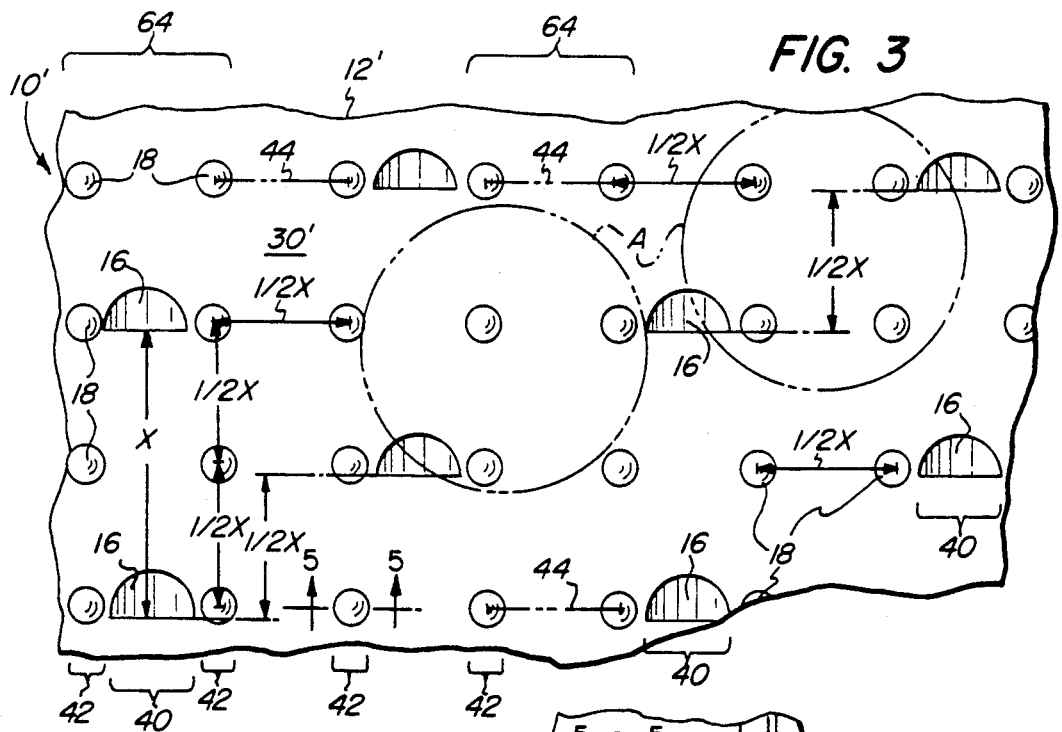
FIG. 3 and 4 are partial top plan views of alternative deck plates for the air conveyor of FIG. 1.

Referring to FIGS. 1, 2 and 3, air conveyors 10, 10' in accordance with the invention are generally shown. Air conveyor 10 comprises a deck plate 12, 12'; a plenum chamber 14; and a plurality of article conveying apertures 16, and a plurality of protuberances 18 formed in and extending from deck plate 12.

Deck plate 12, 12' forms one side of plenum chamber 14. Pressurized air within plenum chamber 14 may be directed, as indicated by arrows 20, toward articles 22 (FIGS. 2 and 5) to transport them atop deck plate 12 generally along a transport path in the direction of arrow 24 (FIG. 1 only). Pressurized air may be provided to chamber 14 by a blower or the like (not shown in any Figure).

Plenum chamber 14 may conveniently be constructed from deck plate 12, 12' and a lower wall 26 formed to define the desired chamber area. Appropriately shaped end walls (not shown in any Figure) are preferably also provided to enclose plenum chamber 14.

Brackets 28 including guide rails 32 are mounted adjacent transport surface 30, 30' on deck plate 12, 12'. Also connected to brackets 28 above guide rails 32 are arms 34 for receiving hold down plate 36. Hold down plate 36 aids in preventing articles 22 from tipping over on deck plate 12, 12'. Preferably, hold down plate 36 is provided with holes 38 permitting air exiting plenum chamber 14 to convey articles 22 in the direction of the conveyor path substantially uniformly across deck plate 12, 12'.

Preferably, article conveying apertures 16 are disposed in deck plate 12, 12' in a plurality of conveying rows 40. Most preferably, conveying rows 40 are aligned substantially along the transport path. Apertures 16 are preferably substantially all spaced apart a distance X from each other within each of conveying rows 40. Similarly, protuberances 18 are preferably arranged on deck plate 12, 12' in a plurality of protuberance rows 42. Most preferably, protuberance rows 42 are aligned substantially along the transport path. Protuberances 18, however, are preferably substantially all spaced apart a distance of about one half times X from each other within each of protuberance rows 42.

Preferably at least one, and most preferably two, of protuberance rows 42 are arranged between adjacent ones of conveying aperture rows 40. Preferably also, at least one protuberance row 42 is arranged on both sides of every row 40 of conveying apertures 16. Preferably, article conveying apertures 16 in each of conveying rows 40 is disposed in deck plate 12, 12' offset by a distance of about one half times X along the direction of the transport path from conveying apertures 16 in adjacent conveying rows 40.

Preferably, adjacent protuberances 18 in adjacent protuberance rows 42 are arranged along lines 44 aligned substantially perpendicular to the transport path. Most preferably, conveying aperture rows 40 and protuberance rows 42 are arranged such that apertures 16 also lie along lines 44. Preferably, adjacent protuberance rows 42 are spaced apart a distance of about one half times X. Most preferably, protuberances 18 are arranged in a rectangular grid spaced apart at intervals of about one half times X.

The magnitude of X is selected with reference to the area A (indicated by dashed lines in FIG. 3) of the bottom surface 46 of articles 22. Protuberances 18 are preferably spaced apart such that at least three, and most preferably four, protuberances support articles 22 substantially at all times.

The combination of conveying apertures 16 and protuberances 18 disclosed in FIGS. 1, 2 and 3 permit air conveyors 10, 10' more reliably to function in environments where the conveyor may accumulate material forming a residue which increases sliding resistance between the conveyors 10, 10' and articles 22. Prior art air conveyors generally have not reliably functioned in such environments because the increased sliding resistance renders them inefficient and eventually useless. Such sliding resistance increasing materials may include particulates or liquids, especially viscous or sticky liquids. Such materials may be carried on or in articles 22, or may be deposited on transport surfaces 30, 30' by other machinery on line with conveyors 10, 10'.

Figure 5:
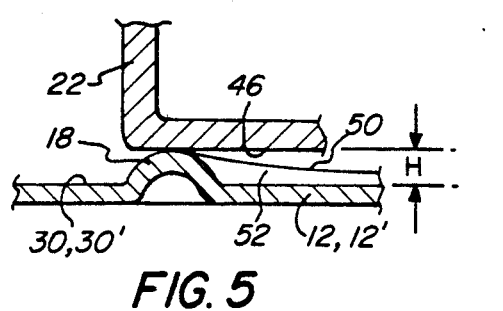
FIG. 5 is a partial end cross-sectional view of a protuberance extending from the deck plate of the air conveyor of FIG. 1 taken along plane 5—5 in FIGS. 1, 3 and 4.

Referring now to FIG. 5, protuberances 18 extend a distance H from transport surface 30, 30' of deck plate 12, 12' to support bottom surface 46 of articles 22 out of contact with accumulated residue 50 of sliding resistance increasing material 52. The magnitude of H will depend upon the amount of material 52 that may accumulate in the particular environment in which conveyor 10, 10' operates.

Figure 4:
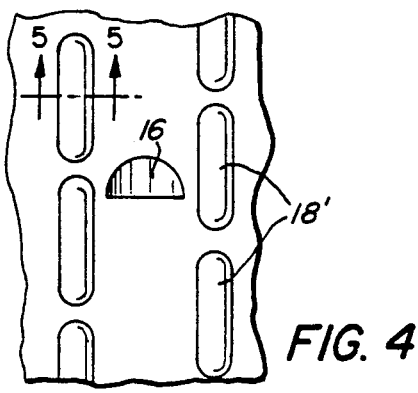

Preferably as shown in FIGS. 1, 2 and 3, protuberances 18 are substantially hemispherical or round and support lower surfaces 46 of articles 22 in substantially point contacts to reduce the area of contact between deck plate 12, 12' and articles 22. Reducing the area of contact between articles 22 and deck plate 12, 12' reduces the area over which slide resistance increasing material may contact articles 22. Other shapes, however, are possible for providing the preferred point contacts with bottom surfaces 46 of articles 22. Further, as illustrated in FIG. 4, other shapes such as oblong protuberances 18' are possible although they do not provide the preferred substantially point contacts with articles 22. Such other shapes, such as oblong protuberances 18', however, may still reduce the area of contact between deck plate 12, 12' and articles 22.

Referring again to FIGS. 1 and 2, deck plate 12 includes a plurality of article lifting apertures 54. Article lifting apertures 54 direct air, as indicated by arrows 56, outwardly from plenum chamber 14 toward bottom surfaces 46 of articles 22 passing thereover. By "article lifting" is meant that apertures aid in lifting articles 22. Preferably, air exits apertures 54 along a direction substantially perpendicularly to both transport surface 30 and the transport path.

Referring now to FIG. 2, protuberances 18 extending from transport surface 30 of deck plate 12 define a gap 58 between bottom surface 46 of articles 22 and transport surface 30 of air conveyor 10. Air exiting plenum chamber 14 through article lifting apertures 54 substantially fills gap 58 to form an air cushion 60. Air cushion 60 aids in further reducing friction between articles 20 and deck plate 12 or protuberances 18.

Returning again to both FIGS. 1 and 2, article lifting apertures 54 are preferably disposed in deck plate 12 in a plurality of lifting rows 62. Most preferably, lifting rows 62 are aligned substantially along the transport path. Preferably, article lifting apertures 54 are spaced apart substantially the distance X in each of lifting rows 62.

Preferably, lifting rows 62 are disposed between adjacent conveying rows 40; most preferably, lifting rows 62 are disposed between both adjacent conveying rows 40 and protuberance rows 42.

Preferably, adjacent lifting rows 62 are spaced apart substantially the distance X. Preferably, lifting apertures 54 are also disposed along lines 44 substantially perpendicular to the transport path. Most preferably, lifting apertures 54 are disposed in a rectangular grid.

Preferably, conveying rows 40 and protuberance rows 42 are arranged in groups 64 including a conveying row 40 and a protuberance row 42 on each side of conveying row 40. A lifting row 62 is preferably disposed between groups 64.

Air cushion 60 enables air conveyor 10 to convey relatively heavy articles 22 at a relatively low speed. In prior art air conveyors, relatively heavy articles may generally only be conveyed, if at all by increasing plenum chamber pressure. Increased pressure, however, may cause the articles to be conveyed at excessive speeds and thus to be damaged upon accumulation. Air cushion 60 aids in lifting articles 22 making them easier to transport on an air conveyor and at lower speeds.

For articles 22 such as metal cups containing cutting fluid, protuberances 18 not only prevent the cups from sticking by spilled fluid to deck plate 12, but also enable the relatively heavy metal cups to be conveyed at a relatively low speed through lifting provided by air cushion 60.

Although the invention has been described with reference to particular arrangements of parts, particular features, and the like, these are not intended to exhaust all possible parts arrangements or features, and indeed many other modifications and variations will be ascertainable to those of skill in the art.

What is claimed is:

1. An air conveyor for conveying articles along a transport path comprising:
   a plenum chamber;
   a deck plate mounted to form one side of said plenum chamber;
   a plurality of first apertures for directing air from said plenum chamber toward said articles in a direction substantially along the transport path to convey said articles, said first apertures disposed in said deck plate in a plurality of first rows substantially parallel with said transport path;
   a plurality of protuberances extending from said deck plate for receiving bottoms of said articles in at least three substantially point contacts to reduce the area of contact between the bottoms of said articles and said deck plate, said protuberances arranged on said deck plate in a plurality of second rows substantially parallel with said transport path; and
   a plurality of second apertures for directing air from said plenum chamber toward the bottoms of said articles to aid in reducing friction between said protuberances and the bottoms of said articles, said second apertures disposed in said deck plate in a plurality of third rows substantially parallel with said transport path.

2. The air conveyor of claim 1 wherein one of said third rows of said second apertures is disposed on said deck plate between adjacent ones of said first rows of said first apertures.

3. The air conveyor of claim 2 wherein said first apertures are spaced apart a first distance X in each of said first rows, and wherein said first apertures are disposed in said deck plate at a position offset a second distance equal to about one half times X along the transport path from said first apertures in adjacent ones of said first rows.

4. The air conveyor of claim 1 wherein pairs of said second rows of said protuberances are arranged on said deck plate between adjacent ones of said first rows of said first apertures.

5. The air conveyor of claim 4 wherein one of said third rows of said second apertures is disposed on said deck plate between adjacent ones of said first rows of said first apertures.

6. The air conveyor of claim 5 wherein one of said third rows of said second apertures is disposed between the rows of said pairs of second rows of said protuberances.

7. The air conveyor of claim 4 wherein said protuberances in said pairs of said second rows are arranged along lines substantially perpendicular to the transport path.

8. The air conveyor of claim 7 wherein said first apertures in one of said adjacent first rows are disposed along said substantially perpendicular lines of said protuberances.

9. The air conveyor of claim 1 wherein said first apertures are spaced apart a first distance X in each of said first rows, and wherein said protuberances are spaced apart a second distance equal to about one half times X in each of said second rows.

10. The air conveyor of claim 9 wherein said second apertures are spaced apart substantially said first distance X in each of said third rows.

11. An air conveyor, for conveying relatively heavy articles along a transport path at a relatively low speed comprising:
    a plenum chamber;
    a deck plate mounted to form one side of said plenum chamber;
    a plurality of first apertures in said deck plate for directing air from said plenum chamber toward said articles in a direction substantially along the transport path to convey said articles;
    a plurality of protuberances extending from said deck plate for receiving bottoms of said articles, and for defining a gap between the bottoms of said articles and said deck plate; and
    a plurality of second apertures in said deck plate for directing air from said plenum chamber into the gap between the bottoms of said relatively heavy articles and said deck plate, and for creating an air cushion beneath said articles to aid in lifting said articles from said deck plate;
    whereby said relatively heavy articles may be conveyed without introducing an unnecessarily high air pressure to said first apertures that would cause the articles to move along the transport path at relatively high speeds which may damage said articles that accumulate.

12. The air conveyor of claim 11 wherein said protuberances receive the bottoms of said articles in substantially point contacts so that said air cushion contacts a major portion of the bottoms of said articles.

13. The air conveyor of claim 11 wherein said first apertures are disposed in said deck plate in a plurality of first rows.

14. The air conveyor of claim 13 wherein said protuberances are arranged on said deck plate in a plurality of second rows, with at least one of said second rows between adjacent ones of said first rows.

15. The air conveyor of claim 14 wherein said second apertures are disposed in said deck plate in a plurality of third rows, with one of said third rows between adjacent ones of said first rows.

16. An air conveyor for conveying articles along a transport path in environments where the air conveyor may accumulate material forming a residue which increases sliding resistance between the air conveyor and the articles comprising:
    a plenum chamber;
    a deck plate mounted to form one side of said plenum chamber;
    a plurality of first apertures for directing air from said plenum chamber toward said articles in a direction substantially along the transport path to convey said articles;

a plurality of protuberances extending from said deck plate for receiving bottoms of said articles substantially continuously in at least three substantially point contacts, said protuberances protruding from said deck plate a distance H sufficient to support the bottoms of said articles substantially out of contact with said sliding resistance increasing residue, whereby sliding resistance between said articles and said deck plate may be reduced.

17. The air conveyor of claim 16 wherein said articles are carrying said material forming said sliding resistance increasing residue.

18. The air conveyor of claim 16 wherein said material forming said sliding resistance increasing residue is a relatively viscous fluid.

19. The air conveyor of claim 16 wherein said first apertures are disposed in said deck plate in a plurality of first rows substantially parallel with said transport path, and wherein said protuberances are arranged on said deck plate in a plurality of second rows substantially parallel with said transport path.

20. The air conveyor of claim 19 wherein pairs of said second rows of said protuberances are arranged on said deck plate between adjacent ones of said first rows of said first apertures.

21. The air conveyor of claim 19 wherein said first apertures are spaced apart a first distance X in each of said first rows, and wherein said protuberances are spaced apart a second distance equal to about one half times X in each of said second rows.

22. The air conveyor of claim 16 comprising a plurality of second apertures for directing air from said plenum chamber toward the bottoms of said articles to aid in reducing friction between said protuberances and the bottoms of said articles.

23. The air conveyor of claim 22 wherein said second apertures are disposed in said deck plate in a plurality of third rows substantially parallel with said transport path.

* * * * *